United States Patent
Parler, Jr. et al.

(10) Patent No.: US 8,098,479 B1
(45) Date of Patent: Jan. 17, 2012

(54) CAPACITOR HAVING ZINC COATED COMMON EDGE WITH WELDED ALUMINUM TERMINAL

(75) Inventors: Samuel G. Parler, Jr., Clemson, SC (US); Herbert David Leigh, III, Central, SC (US)

(73) Assignee: Cornell Dubilier Marketing, Inc., Liberty, SC (US)

( * ) Notice: Subject to any disclaimer, the term of this patent is extended or adjusted under 35 U.S.C. 154(b) by 639 days.

(21) Appl. No.: 12/284,269

(22) Filed: Sep. 19, 2008

(51) Int. Cl.
*H01G 4/228* (2006.01)
*H01G 2/20* (2006.01)
*H01G 4/32* (2006.01)
*H01G 4/00* (2006.01)
*H01G 4/08* (2006.01)

(52) U.S. Cl. .......... 361/309; 361/308.1; 361/301.5; 361/301.1; 361/323

(58) Field of Classification Search .......... 361/301.5, 361/313, 311, 309, 323, 301.1, 301.4, 308.1, 361/303
See application file for complete search history.

(56) References Cited

U.S. PATENT DOCUMENTS

| | | | |
|---|---|---|---|
| 3,277,559 A | 10/1966 | Clair, Jr. .................. 29/155.5 |
| 3,686,538 A | 8/1972 | Webster .................. 317/230 |
| 4,694,377 A * | 9/1987 | MacDougall et al. ...... 361/275.1 |
| 4,788,625 A * | 11/1988 | Maijers .................. 361/306.1 |
| 4,889,536 A | 12/1989 | Naitoh et al. .......... 29/570.1 |
| 6,118,651 A | 9/2000 | Mehrotra et al. ........ 361/509 |
| 6,166,899 A * | 12/2000 | Tamamitsu .............. 361/504 |
| 6,208,502 B1 | 3/2001 | Hudis et al. ............ 361/503 |
| 6,307,733 B1 | 10/2001 | Maruyama et al. ...... 361/511 |
| 6,466,428 B1 | 10/2002 | Wei et al. .............. 361/502 |
| 6,498,713 B2 * | 12/2002 | Sanger et al. .......... 361/303 |
| 6,653,018 B2 | 11/2003 | Takahashi et al. ...... 429/185 |
| 6,687,116 B2 | 2/2004 | Hudis .................. 361/502 |
| 7,158,367 B2 | 1/2007 | Fujimoto et al. ........ 361/532 |
| 7,224,575 B2 | 5/2007 | Sherwood .............. 361/508 |
| 7,233,485 B2 | 6/2007 | Fujimoto et al. ........ 361/531 |
| 7,256,981 B2 | 8/2007 | Kosuda et al. .......... 361/502 |
| 7,310,219 B2 | 12/2007 | Kosuda et al. .......... 361/502 |
| 7,355,841 B1 | 4/2008 | Schmidt et al. ......... 361/520 |

(Continued)

FOREIGN PATENT DOCUMENTS

| | | |
|---|---|---|
| JP | 3042813 | 2/1991 |
| JP | 10308206 | 11/1998 |
| JP | 2001110683 | 4/2001 |
| JP | 2002083738 | 3/2002 |

OTHER PUBLICATIONS

Evans, William., "Resistance Welding of Dissimilar Metals." *Common Parts, IEEE Xplore*; vol. 11, Issue 2, Jun. 1964. pp. 157-162.
MIL-STD-202G, MTHOD 2114, "Terminal Strength." Apr. 14, 1969. pp. 1-7.
General Technical Information, EPCOS AG; Aug. 2000. pp. 283-319.

*Primary Examiner* — Jayprakash N Gandhi
*Assistant Examiner* — Arun Ramaswamy
(74) *Attorney, Agent, or Firm* — Timothy J. Monahan; Monahan & Moses, LLC (57) ABSTRACT

A capacitor is provided having a capacitor element, with first and second metalized thermoplastic sheets, which are offset and wound together to create common edges at opposite ends, a zinc or zinc-rich conductive coating thermally sprayed on each of the common edges of the capacitor element, and aluminum or aluminum-rich terminals welded to each of the conductive coatings to form a metallurgical bond, having a pull strength of at least 5 pounds, without damaging the capacitor element.

22 Claims, 3 Drawing Sheets

U.S. PATENT DOCUMENTS

| | | | |
|---|---|---|---|
| 7,365,960 B2 | 4/2008 | O'Phelan et al. | 361/508 |
| 2003/0031926 A1 | 2/2003 | Farmer et al. | 429/176 |
| 2008/0002334 A1 | 1/2008 | Kakuma et al. | 361/511 |
| 2008/0019079 A1 | 1/2008 | Ozawa et al. | 361/503 |

* cited by examiner

CAPACITOR HAVING ZINC COATED COMMON EDGE WITH WELDED ALUMINUM TERMINAL

BACKGROUND OF THE INVENTION

The present invention is directed to a capacitor having a metallurgical bond formed by welding an aluminum terminal to a zinc coating, wherein the zinc coating has been thermally spayed on the common edge of a multi-layer plate in a capacitor element. The invention is particularly useful in solid state capacitors.

Capacitors may be produced by winding together two metalized plastic films, to form a cylindrical shape. By way of example, the metalized film may be a polypropylene film substrate having a zinc, aluminum or zinc-aluminum alloy coating, created by vapor deposition of the metal. The two films are offset or staggered slightly so that the edges do not overlap, thereby creating a common edge at either end of the cylinder. The ends of the cylinder are then surface coated with a layer of zinc or zinc alloy, typically by a thermal spraying technique, such as arc spaying. The coating formed on the end of the cylinder is sometimes referred to as an "end spray."

Terminals are attached to the coating on the common edge, at each end of the capacitor. Both terminals can be placed on the same side of the cylinder, for example, by running the bottom terminal through an insulated tube down the center of the cylinder. The terminals or leads are typically a metal strip or tab. Terminals comprising a single metal or an alloy of two or more metals have been employed. Alternatively, the terminal may be plated with a second metal or comprise a laminate structure of two or more metals, in an effort to enhance the compatibility of the metals sought to be joined.

One prior art method of attaching a terminal to a zinc end spray is by soldering. The bond generated by soldering gets its strength from the filler metal and its affinity for the surfaces to which it is bonded. There are two important conditions for the bond to occur. First, the filler metal (solder) must be melted, and second, the molten solder must wet the surface or surfaces that are to be joined. The wettability of a surface is influenced by its cleanliness, as well as the attraction of the solder to the metals to be joined.

Fluxes are often used to remove barriers, such as primarily oxides, between the filler metal and the bonding surface during soldering. High temperatures during soldering tend to promote fluidity and penetration of the solder, and aggressive fluxes tend to be more efficient at oxide removal. Both of these conditions, however, also promote damage of the metalized substrate (e.g. thermoplastic film) comprising the capacitor element, by melting and contamination of the film and its metallization, thereby reducing the performance of the capacitor. These considerations have led to the development of low melting solders and fluxes with benign residues. For example, copper terminals have been soldered to a zinc coating on a capacitor using near-eutectic lead-tin solder. The melting point of eutectic lead-tin solder is 183° C. This temperature is high enough to melt polypropylene film, but if the volume of solder is small, the time of heating is kept short and the end spray coating is sufficiently thick, then thermal damage to the film underneath the end spray can be minimized.

Regulations mandating the removal of lead from solder compositions have been enacted, such as *The Restriction of the Use of Certain Hazardous Substances in Electrical and Electronic Equipment Regulations* 2006 ("RoHS Regulations") promulgated by the European Union. Unfortunately, employing materials in compliance with the regulations greatly raises the melting temperature of the solder and increases the likelihood of damage to capacitors containing a thermoplastic film substrate. These new solders also require more aggressive fluxes which can have a negative effect on reliability and life.

Various approaches have been used in the industry to achieve a good terminal attachment while mitigating film damage. To improve wetting, common edge coatings (end sprays) containing tin, such as a tin/zinc alloys have been used. Alternately, tin-rich coatings have been flame or arc sprayed on top of the initial zinc end spray. Both of these techniques present a tin-rich surface that is very wettable—provided the surfaces are protected against oxidation or hydration. To mitigate melting of the underlying film, a thicker coating on the common edge of the capacitor element has been used. Obviously this adds cost and weight, and is of limited value. Another drawback to employing tin or a tin alloy in the end spray is the lack of solubility between tin and certain other metals, which inhibits a strong metallurgical bond from forming.

The copper terminals that are used on high current film capacitors, such as power DC film capacitors rated hundreds of microfarads and tens of amps of ripple current, are typically 0.25 to 1.0 mm in thickness, in order to carry the load current without overheating. Various attempts have been made to weld a copper terminal to the zinc coated common edge of a capacitor. For example, a tin-plated copper terminal has been welded to a zinc coating using parallel electrodes, in a process referred to as "stitch welding." The energy required to weld the components can be minimized, in order to avoid damaging the thermoplastic film, by thinning the copper terminal to a thickness of about 0.25 mm at the welding site.

For good bonding to occur there should be some solubility between the dissimilar metals comprising the weld, for example copper-tin-zinc. Tin was thought to play a significant role in the terminal welding process. Tin forms an eutectic liquid with zinc at 198° C., and upon cooling the system forms a two phase bond between tin and zinc. The relationship between tin and copper is more complex. A eutectic between copper and tin occurs at 227° C., and upon cooling, the bond is composed of two phases. The first phase is a tin solid solution and the second phase is the inter-metallic, phase $Cu_6Sn_5$, which is also known as the eta prime ($\eta'$) phase at room temperature.

Initially, an assumption was made that the primary reaction at the interface was between tin and zinc, which formed a zinc/tin alloy at the surface. Energy Dispersive X-ray analysis ("EDX"), however, shows that the bonding preferentially occurs between the reaction of copper and zinc. The tin has greater solid solubility with copper and was found to be associated with the copper epsilon phase in the bond. The zinc-tin alloy is in the form of two distinct phases and is believed to be relatively unstable. Another drawback of using tin-plated copper terminals is the tendency of tin to oxidize, making it more difficult to work with.

The bond between the terminal and the coating on the end spray (common edge of the capacitor element) must meet minimum "pull strength" requirements, that is, the terminal must be able to withstand being separated from the end spray coating when the terminal is physically pulled. The bond between the terminal and coating must remain strong over time and resist oxidation and corrosion.

In addition to the electrical connection between the terminal and the zinc coating on the common edge of the capacitor element, the opposite end of the terminal is typically connected to a header. The header may be made of brass. Thus, a further requirement of many terminals used in capacitors is that they can be welded to a brass fixture, within the capacitor header.

SUMMARY OF THE INVENTION

The present invention has the objective of providing a terminal bonded to the coating on the common edge of a capacitor element, which overcomes the shortcomings of the prior art. The advantages of the present invention include: the elimination of soldering; improved pull strength at the site of the terminal-coating bond (both before and after heat aging); resistance to oxidation and corrosion at the site of the bond; high bond strength relative to the energy input required to weld the terminal to the coating; avoiding heat damage to the capacitor element; and terminal conductivity that is comparable to copper at a reduced cost.

The present invention relates to capacitors that do not contain an electrolyte (non-electrolytic capacitors). Examples of types of capacitors which may incorporate the present invention include: solid state capacitors, fluid filled capacitors in which the fluid is a not an electrolyte, such as gas or oil filled capacitors, and capacitors whose element is potting in a thermosetting polymer such as epoxy or polyurethane. The present invention is not directed to semiconductor devices or thin-film capacitors.

The capacitor element is the arrangement of first and second conductive plates, separated by a dielectric and capable of supporting a direct current potential, and thereby storing an electrical charge and energy. Typically, the capacitor element will comprise multiple layers of conductive plates separated by a dielectric. For example, plates from a first set of conductive plates and plates from a second set of conductive plates are alternated to form multiple layers, separated by a dielectric, and offset or staggered relative to each other to create a common edge for each of the plates in the first set of plates and a common edge for each of the plates in the second set of plates, at opposite ends of the capacitor element.

The capacitor element may be constructed from a combination of metalized plastic film, metal foil and non-metalized plastic film ("plain film"). In one example, the capacitor element is an arrangement of two polymer sheets, each having a metalized surface. The metal may be applied by vapor deposition. The sheets may be folded, stacked, or wound together to form a cylinder, as is known to persons skilled in the art, to create the common edges. The sheets may be made of a thermoplastic polymer having a melting temperature of 295° C. or less, such as a polyolefin or polyester.

By way of example, a capacitor element formed by winding together two polymer sheets, each having a metalized surface, may comprise from 100 to 10,000 plates, each separated by a dielectric, as calculated along a radius perpendicular to the axis of the cylinder.

A metal coating is applied by thermal spraying to each common edges of the capacitor element, thereby providing a site for the connection of a terminal to the common edge of a conductive plate. The metal coating is zinc or a zinc-rich metal containing at least 65% zinc. Thermal spraying creates pore spaces in the coating. Without being bound to a particular theory, it is believed that the pore spaces provide protection against melting the underlying capacitor element during subsequent welding operations, especially when the capacitor element comprises thermoplastic sheets. A minimum coating thickness of 0.25 mm is preferably employed.

A terminal is welded to at least one of the coatings, preferably both of the coatings, which have been applied to the common edges of the capacitor element plates, to create a metallurgical bond. The terminal is aluminum or an aluminum-rich metal containing at least 65% aluminum. The terminal can be welded to the coating by "stitch-welding," AC resistance welding, DC pulse discharge welding, or preferably, by parallel-electrode inverter pulse welding.

In another embodiment of the invention, a plurality of capacitor elements, each having a metal coating applied to the common edges of the first and second plates, as disclosed above, are electrically connected, either in series or parallel. The electrical connection may be accomplished by welding the coating applied to the first and second common edges of each capacitor element to common terminals, respectively, wherein the common terminals are aluminum or aluminum-rich (at least 65% aluminum) plates or sheets.

DETAILED DESCRIPTION OF THE INVENTION

Without limiting the scope of the invention, the preferred embodiments and features are hereinafter set forth. Any United States patents cited in the specification are incorporated by reference. Unless otherwise indicated, conditions are 25° C., 1 atmosphere of pressure, 50% relative humidity, the percentage of materials in compositions are by weight, and melting temperature is determined by differential scanning calorimeter.

Figure 1:
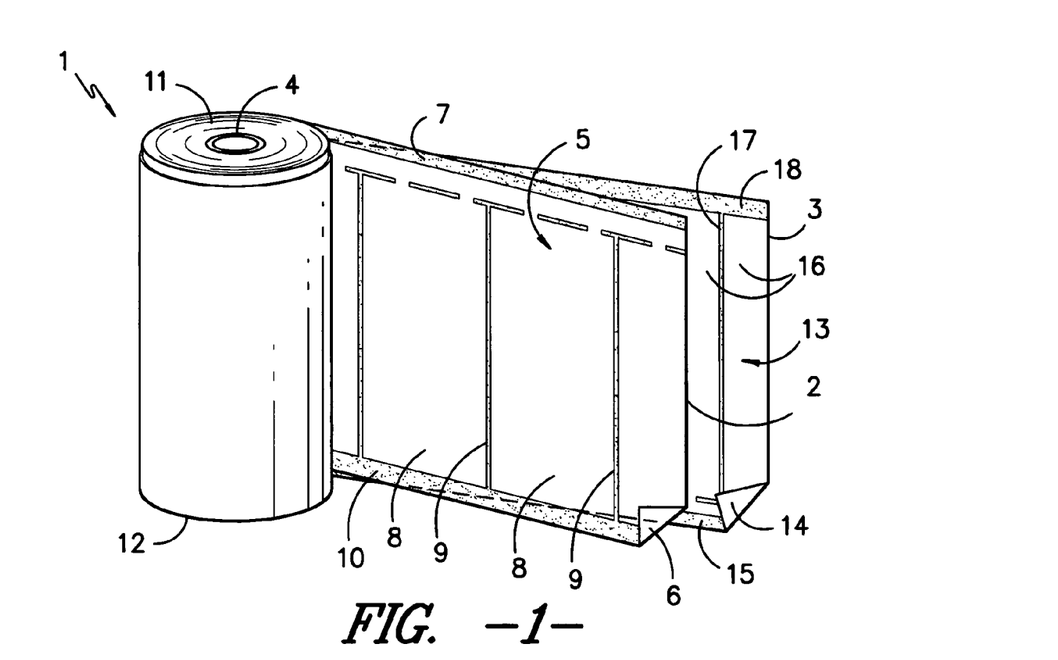
FIG. 1 is a perspective view of the capacitor element, in which the element is shown partially unwound to display the details of the component sheets.

FIG. 1 shows capacitor element 1 formed of metalized sheets 2 and 3 wound around a hollow, insulated core 4. Sheet 2 has a conductive side 5, which may be formed by vapor deposition of a conductive metal on a polymer substrate and opposite side 6, which is uncoated and not conductive. By way of example, the metal deposited on the substrate may be zinc, aluminum, or an alloy of zinc and aluminum. Sheets 2 and 3 are preferably polymers. By way of example, the sheets may be a thermoplastic, thermosetting or elastomeric polymer. Specific examples include polyolefins, especially polyethylene, polypropylene and ethylene/propylene copolymers, and polyesters, especially polyethylene terephthalate (PET) and polyethylene naphthalate (PEN). The polymer substrate may be 0.3 μm to 30 μm thick, preferably 1.0 μm to 8 μm thick. By way of example, the width of the polymer substrate may be from 20 mm to 200 mm.

In a preferred embodiment, the sheets comprising the capacitor element have a relatively high energy density by way of intrinsically high electric field strength, that is, an electric field strength of 180 VDC or 60 VAC RMS per micron or greater.

Sheet 2 has heavy edge 7 along its upper edge, which is an area of the sheet with a relatively thicker deposit of metal to promote adhesion to the thermal spray. Sheet 2 is divided into segments 8 by non-conductive strips 9 created by masking sheet 2 prior to deposition of the metal vapor. The segments minimize the risk of short-circuit failure of the entire capacitors in the case of localized failure of the capacitor element. Sheet 2 has non-conductive margin 10 along its lower edge, also created by masking sheet 2 prior to metal deposition.

Sheet 3 may be identical to sheet 2, but is not necessarily so. For example, sheet 3 may be a different substrate and have a different metal or metallized pattern deposited thereon, relative to sheet 2. In FIG. 1, sheet 3 is shown as a mirror image of sheet 2. Sheets 2 and 3 are offset vertically or staggered relative to each other so that an electrical connection can be made at the common edge of each sheet or plate. In the example shown in FIG. 1, sheet 2 is offset vertically by approximately 0.5 to 2 mm higher than sheet 3, so that the layers of sheet 2 form common edge 11, at the top of capacitor element 1, and the layers of sheet 3 form common edge 12, at the bottom edge of capacitor element 1.

Sheet 3 has metalized side 13 and uncoated side 14. Sheet 3 has heavy edge 15, along its lower edge. Sheet 3 is divided into segments 16 by non-conductive strips 17 created by masking sheet 3 prior to deposition of the metal vapor. Sheet 3 has non-conductive margin 18 along its upper edge, also created by masking sheet 3 prior to metal deposition.

Those with skill in the art will understand that there are alternative ways to structure a capacitor having a first set and second set of conductive plates separated by a dielectric, wherein the conductive plates are staggered to create a common edge. For example, the components of the capacitor element may be arranged in multiple layers by folding, or they may be wound around a rectangular core to create a rectangular, rather than a cylindrical shape. The core may be collapsible, for example, such as compliant plastic or cardboard. Also within the scope of the invention are capacitor elements where there is no core ("coreless winding") to allow a flat capacitor element. Stacked film capacitor elements and their method of manufacture are known to those skilled in the art and are included within the present invention. Additionally, it may be understood by those skilled in the art that the conductive portion of the plates forming the capacitor element may be staggered by providing a non-conductive margin along one edge of a first sheet and a non-conductive margin along an opposite edge of a second sheet, without actually shifting the position of the two sheets relative to each other. Nevertheless, it is believed that improved adhesion of the zinc coating and improved conductivity may be obtained when the entire sheets, not just the conductive portion, are staggered relative to each other to form an uneven surface on the common edge.

The conductive plates may be selected from metal sheets. The dielectric may be any insulating polymer, including polypropylene, polyester, polyethylene, polyamide, polyimide, etc. In one embodiment of the invention, there may be more than two dielectric sheets. For example, a third sheet may be added, whose primary purpose is to provide a metallized surface which connects the first two sheets in series electrically.

The term "sheet" is used in its general sense to describe a material that is thin in comparison to its length and breadth and is intended to include films and foils.

Figure 2:
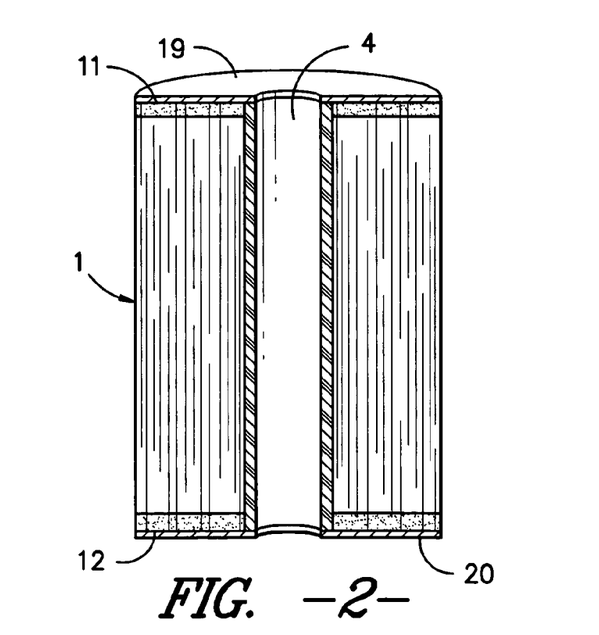
FIG. 2 is a cross-sectional view of the capacitor element, with a conductive coating applied to the common edge at each end of the capacitor element.

FIG. 2 is a cross-sectional view of capacitor element 1 with a metal coating 19 and 20 applied to common edges 11 and 12 of the capacitor element, respectively. The metal coatings 19 and 20 are applied by thermal spraying. Examples of suitable thermal spraying methods include arc spraying, especially electric arc and gas flame spraying. The coatings are zinc, which may include minor amounts of impurities, or a zinc-rich alloy containing at least 65% zinc, preferably at least 80% zinc, most preferably at least 94% zinc. Examples of zinc-rich alloys include alloys of zinc and tin.

The coating is preferably applied at a minimum thickness of at least 0.10 mm, to protect the capacitor element during subsequent welding operations. Coatings thicknesses of 0.2 to 1.5 mm are most preferred. Coating thicknesses of greater than 1.5 mm may be employed, but result in increased weight and cost. The coating thickness is calculated by measuring from the outermost plate or sheet extending from the common edge of the capacitor element, rather than from the trough or recess formed by staggering respective plates or sheets.

Thermal spraying creates a porous, laminar structure, as sprayed particles strike the substrate, flatten and form an irregular surface of platelets. The porosity depends on the thermal spray process, application parameters, including the particle velocity, particle temperature and atomization gas, and the metal used. Coatings having a porosity of 10 to 60%, preferably 20 to 40%, relative to solid material are useful. It is believed that the porous structure of the coating slows the transfer of heat during welding and protects the capacitor element from damage, for example melting of the thermoplastic substrate, which would otherwise necessitate a substantially thicker coating of the metal, thereby increasing the expense and weight of the capacitor. Porosity also allows trapped air or voids in the film to be replaced by a dielectric fluid.

Figure 3:
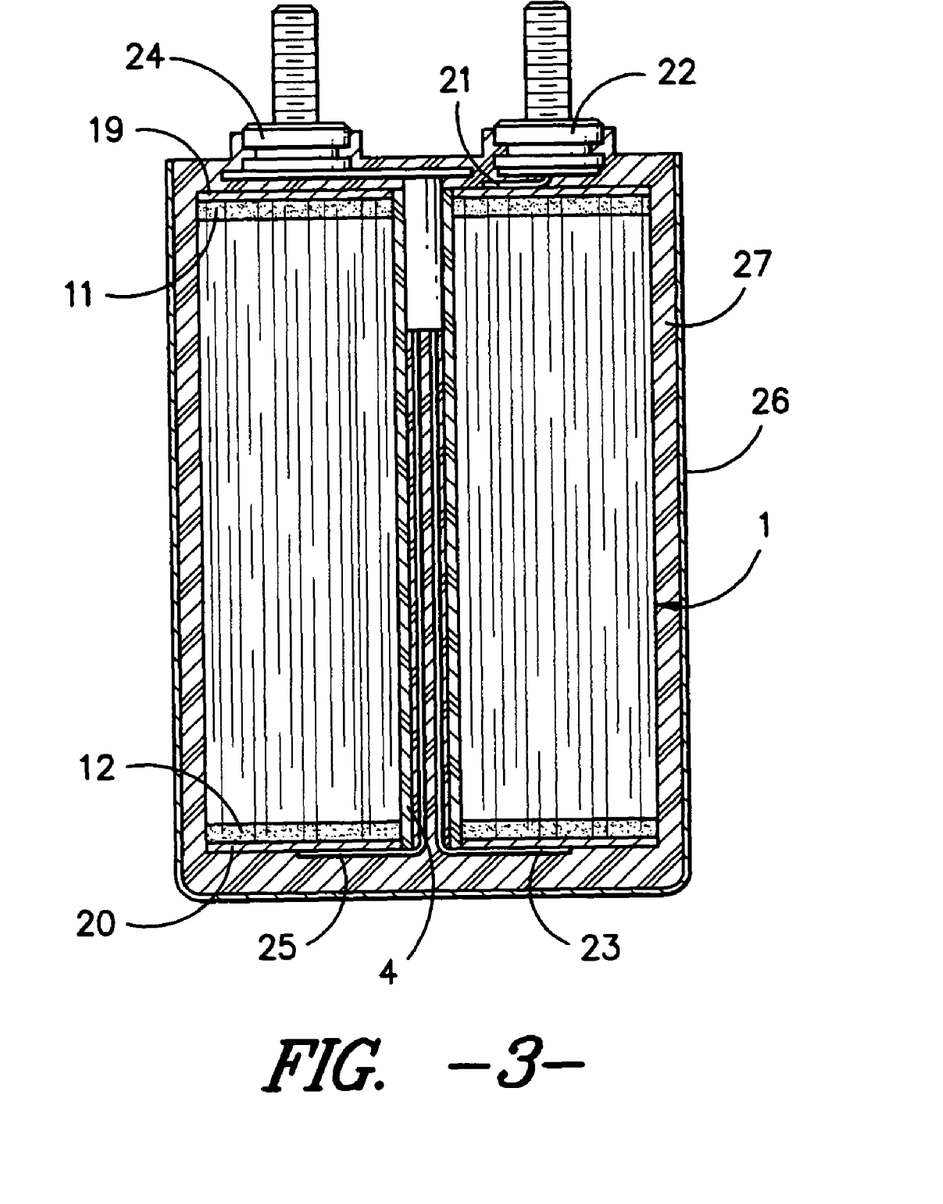
FIG. 3 is a cross-sectional view of the assembled capacitor.

FIG. 3 shows the capacitor with terminal 21 having one end welded to coating 20, on the top of capacitor 1, and an opposite end electrically connected to header 22. In FIG. 3, a single terminal is shown connecting header 22 to coating 19, and thus to the common edge 11 of capacitor element 1. In practice, it is useful to employ multiple terminals having one end welded to the surface of coating 19 and an opposite end welded to header 22. By way of example, 2 to 8 terminals are preferably spaced over the surface of coating 19 and connected to header 22.

Terminal 23 has one end welded to coating 20, at the bottom of capacitor element 1. Terminal 23 runs through insulated core 4, and its opposite end is electrically connected to header 24. Alternatively, terminal 23 may be routed around capacitor element 1. Multiple terminals may be employed to electrically connect coating 20 to header 24, as described herein with regard to the use of multiple terminals between coating 19 and header 22. By way of example, a second terminal, terminal 25 is welded to coating 20 and electrically connected to header 24.

Headers 22 and 24 may be made of brass and terminals 21 and 23 may be electrically connected by welding or soldering the terminal end to the headers.

The terminals may be in the shape of a strip, having a thickness of from 0.05 mm to 1.5 mm, preferably 0.20 to 0.7 mm. The terminals are aluminum, which may include minor amounts of impurities, or an aluminum-rich alloy containing at least 65% aluminum, preferably at least 80% aluminum, most preferably at least 90% aluminum. Examples of aluminum-rich alloys include alloys of aluminum and copper, silicon, and manganese.

The weld connecting terminal 21 to coating 19 and terminal 23 to coating 20 are metallurgical welds. The welds are characterized by appreciable inter-atomic penetration taking place at the original boundary surfaces between the terminal and the coating. The boundaries more or less disappear at the weld, and integrating crystals develop across the boundaries. The metallurgical weld may be a solid solution or intermetallic phases may be present.

One objective of welding the terminal to the coating is to produce high pull strength while reducing or eliminating damage of the capacitor element, for example, when the capacitor element comprises a thermoplastic substrate. Pull strength is the measure of the strength of the attachment between the terminal and the coating. One test method that may be used is MIL-STD-202G, method 211A, Test Condition A. A pull strength of 5 pounds is a typical minimum specification. In accordance with the present invention, a pull strength of 10 pounds or greater can be readily achieved, without damage to the capacitor element. The method of holding the tab is with knurled cylindrical quick-locking grippers. The tests were performed to a force which pulled the tabs away from the zinc. It is measured by mounting the winding securely to a table, and pulling the tab or terminal away from the zinc end-sprayed end of the winding in the direction perpendicular to the zinc surface. A digital tensile force gauge such as the Mark-10 MG50 with knurled grippers is used to pull the tab and to measure the peak force.

One method of welding, which has been found to particularly useful is "stitch" welding. For example, a welding apparatus using two parallel electrodes and an inverter power supply, with both voltage and current feedback, allows delivery of a precise amount of power in a specified time window by: controlling the current or power magnitude; the shape and width of the welding pulse or pulses; and the pre-weld, post-weld, and inter-pulse delay times. An example of useful welding apparatus is the Unitek-Miyachi brand Thinline 80 Weld Head, with an IPB 500A power supply.

The capacitor is completed by sealing the winding-tab-header assembly into a housing, such as an oil-filled metal can; a thermosetting polymer-filled metal or plastic case; or even by wrapping the assembly in an overlapping electrically insulating adhesive tape and potting the ends in a thermosetting polymer.

Figure 4:
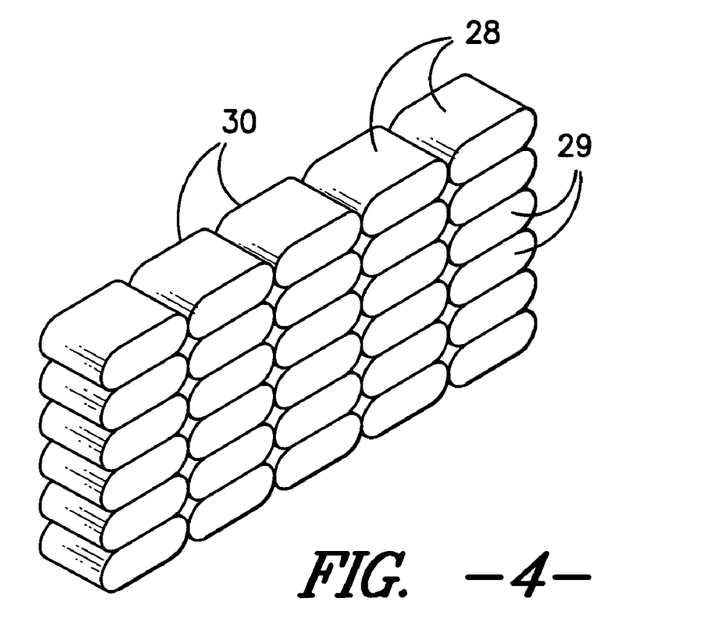
FIG. 4 is a perspective view of an array of capacitor elements.

Referring to FIG. 4, an embodiment of the invention comprising an array of capacitors is shown. This embodiment is described generally in terms of the capacitor element, coating (end spray) and terminal. It can be understood that each of the capacitor elements and coatings that comprise the individual capacitors in the array may be manufactured according to the description contained herein, with regard to a single capacitor. Capacitor elements 28 are arranged in a 5 by 6 array. The end of each of capacitor elements 28 has been coated by thermal spraying with a zinc or zinc-rich material, to provide coating 29. The opposite end of each of capacitor elements 28 is also provided with a conductive coating 30.

Figure 5:
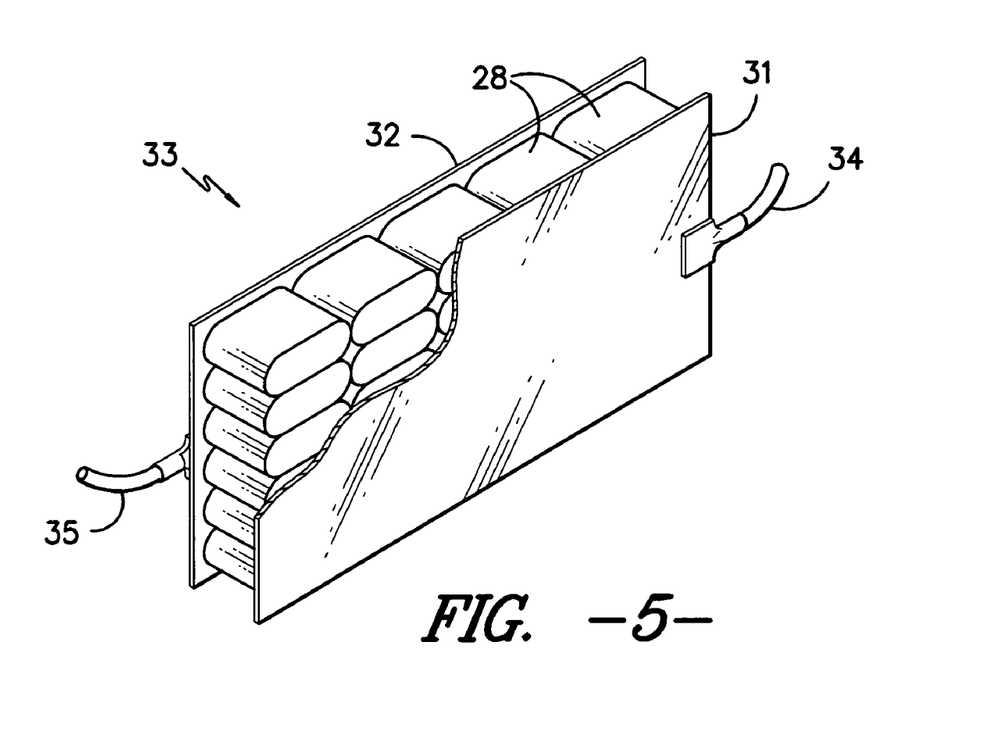
FIG. 5 is a perspective view, with cutaway, showing an array of capacitor elements, with the common edges of the elements electrically connected to opposite plates.

Referring to FIG. 5, capacitor elements 28 are electrically connected by terminal sheets 31 and 32, which are welded to coatings 29 and 30, respectively, on opposite sides of capacitor elements 28, to create a metallurgical weld. The multi-element capacitor array 33 is shown in FIG. 5 with the capacitor elements 28 connected in parallel. Those skilled in the art can understand that the capacitor elements 28 may also be arranged in series by incorporating multiple conductive plates (terminals) to interconnect the windings, and adding additional insulation to prevent end-sprayed common edges of different potential from short-circuiting.

The methods described above with regard to welding a terminal to the coating on a single capacitor element can be repeated multiple times, to weld a single terminal sheet to the coating of multiple capacitor elements in array 33.

Terminal sheets 31 and 32 are aluminum, which may include minor amounts of impurities, or an aluminum-rich alloy containing at least 65% aluminum, preferably at least 80% aluminum, most preferably at least 90% aluminum. Examples of aluminum-rich alloys include alloys of aluminum and copper, silicon and manganese. The terminal sheets 31 and 32 may have a thickness of from 0.25 mm to 1.5 mm, preferably 0.30 to 0.45 mm. Connections 34 and 35 allow terminal sheets 31 and 32, respectively, to be electrically connected to another device.

The following examples illustrate the present invention. Additionally, various surprising and unexpected advantages of the present invention are shown by the following comparative tests.

EXAMPLES AND COMPARATIVE TESTING

Example 1

This example describes fabrication of a capacitor of the present invention.

The capacitor element comprises two T-segmented biaxially-oriented polypropylene (BOPP) films of 5.8 µm thickness and 125 mm width metallized with aluminum of body resistivity 12 ohms per square and zinc heavy edge of 2 to 5 ohms per square and width of 4 to 8 mm. Margin width is approximately 2.5 to 4 mm. The two films were staggered 1.0 to 1.5 mm and wound together to form a cylinder. The target capacitance was 270 microfarads.

Each of the ends of the wound capacitor element is arc-sprayed with pure zinc wire of 2.0 mm diameter, lightly lubricated with machine oil. The wire is atomized with approximately 150 amps DC with dry air of pressure 5 to 6 bar. The distance from the spray gun(s) to the winding end target is 0.2 to 0.3 meters. The metal is built to a thickness of approximately 0.5 mm. The sprayed unit is cured in an oven at approximately 90° C. for at least 12 hours.

The aluminum tab material is 0.4 mm thick and 8 mm wide, and is of at least 99% purity and dead soft temper. The tab is welded to the zinc with a parallel-electrode scheme with two identical constant-power pulses, each of magnitude 2.5 kW and duration 30 milliseconds, with a rest of 90 milliseconds between pulses. Electrode-to-electrode centerline spacing was approximately 5 mm. The force of each electrode is approximately 7 lbs. The electrode force is applied for approximately 150 ms before the first weld pulse begins, and the force continues to be applied until 300 ms after the end of the second weld pulse. The electrodes are made of 3 mm diameter 2% thoriated tungsten alloy rods (98% tungsten/2% thorium) with 2 mm ball nose tip. The rods extended approximately 6 mm from the contact block. Each pair of stitches is sufficient to handle approximately 50 amps of current.

The polypropylene substrate forming the capacitor element was examined for damage—no melting, impairment of capacitor performance or other damage was observed.

Example 2 (Comparative)

The capacitor of Example 1 was made substituting a copper tab having the dimensions 0.25 mm thickness and 7 mm width. The copper was dead-soft alloy 110, and was hot-tin-dipped. The copper terminal was stitch-welded to the zinc end spray with the same conditions as aluminum except 3.0 kW instead of 2.5 kW, indicating that more energy was needed to stitch the copper tab, despite its thickness being 33% less than that of the aluminum tab.

The thickness of the copper was 0.25 mm, rather than the 0.4 mm thickness of the aluminum, to compensate for the relatively greater conductivity of the copper and lower the energy required to weld the copper and protect the capacitor element from damage.

The polypropylene substrate forming the capacitor element was examined for damage—no melting, impairment of capacitor performance or other damage was observed.

Example 3

Test of Pull Strength Before and after Heat Aging

The pull strength of the welds of the capacitor of Example 1 (aluminum terminal welded to zinc) and Example 2 (copper terminal welded to zinc) were tested according to MIL-STD-202G, Method 211A, Condition A, with knurled cylindrical grippers and tested to failure. The tests were typically performed on each lead, for a minimum of 12 leads for each test condition. Next, the capacitors were subjected to industry standard accelerated aging tests, that is, the capacitors were subjected to a normal-atmosphere, at 85° C. for one week. The results are shown in Table 1 below. The reported confidence is based on a 90% confidence level.

TABLE 1

Pull Strength (pounds) Before and After Heat Aging

| Terminal | Average Pull Strength Before Heat Aging | Average Pull Strength After Heat Aging |
|---|---|---|
| Aluminum | 20.2 lbs[1] | 21.5 lbs[2] |
| Copper | 10.4 lbs[3] | 2.6 lbs[4] |

[1]Confidence Interval for the Average = 1.8
[2]Confidence Interval for the Average = 2.4
[3]Confidence Interval for the Average = 0.5
[4]Confidence Interval for the Average = 0.5

This experiment dramatically demonstrates that the copper tabs are subject to a serious potential bond strength loss. The tin-plated copper terminals suffered a decrease in pull strength of approximately 75%, but surprisingly the aluminum tab bond suffered no strength loss. Based on the pull strength of the aluminum terminal, it is apparent that aluminum/zinc bond was not adversely affected by the accelerated aging test.

One can also observe the difference in absolute pull strength between the aluminum-zinc weld and the copper weld. It is surprising that even though (i) the aluminum tabs (terminals) were approximately 60% thicker than the tin-plated copper tabs, and (ii) lower energy was used to weld the aluminum terminal compared to the tin-plated copper tabs (2.5 kW versus 3.0 kW, respectively), the pull strength of the aluminum tab weld was approximately double the pull strength of the copper tab prior to heat aging and approximately eight times the pull strength of the copper tab after heat aging.

The greater pull strength (stronger bond) per unit of energy input for the aluminum-zinc weld is important in minimizing localized heat damage to the capacitor element. The criticality of avoiding damage to the capacitor element is particularly relevant to films operating under high electric fields (200 volt/micron or greater field intensity).

The invention may be further understood by reference to the following claims.

What we claim is:

1. A capacitor, comprising:
   (a) a capacitor element having a first set of conductive plates and a second set of conductive plates, wherein the plates in the first set of plates and the plates in the second set of plates are arranged in alternating layers, separated by a dielectric, and wherein the first set of plates and the second set of plates are staggered relative to each other to create a first common edge for the first set of plates and a second common edge for the second set of plates;
   (b) a first metal coating applied to the first common edge of the capacitor element and a second metal coating applied to the second common edge of the capacitor element, wherein the first and second coatings are applied by thermal spraying, and wherein the first and second coatings are selected from the group consisting of zinc and zinc rich alloys; and
   (c) a first metal terminal welded to the first coating to form a metallurgical bond, wherein the first metal terminal is selected from the group consisting of aluminum and aluminum rich alloys, and a second metal terminal connected to the second coating.

2. The capacitor of claim 1, wherein the first set and second set of conductive plates and dielectric of the capacitor element are comprised of first and second polymer sheets having a metalized surface, wherein the first and second sheets are staggered and wound together to form a cylinder, and the first and second common edges of the capacitor element are the ends of the cylinder.

3. The capacitor of claim 2, wherein the first and second polymer sheets comprise a thermoplastic polymer, which have a metal layer applied by vapor deposition.

4. The capacitor of claim 3, wherein the first and second polymer sheets comprise a polymer selected from the group consisting of polyethylene, polypropylene, ethylene/propylene copolymers, polyethylene terephthalate, and polyethylene naphthalate.

5. The capacitor of claim 1, wherein the metal coating applied to the first and second common edges of the capacitor element is applied by electric arc or gas flame spraying.

6. The capacitor of claim 5, wherein the metal coating applied to the first and second common edges of the capacitor element has a thickness of from 0.2 to 1.5 mm.

7. The capacitor of claim 5, wherein the metal coating is zinc.

8. The capacitor of claim 1, wherein the first terminal is a strip of metal having a thickness of from 0.05 to 1.5 mm.

9. The capacitor of claim 8, wherein the first terminal is aluminum.

10. The capacitor of claim 1, wherein the metallurgical bond between the metal coating applied to the first common edge and the first metal terminal is a solid solution, and the pull strength of the bond is at least 5 pounds.

11. A capacitor, comprising:
    (a) a capacitor element comprising first and second thermoplastic polymer sheets having a metalized surface formed by vapor deposition, wherein the first and second sheets are arranged in multiple layers and staggered relative to each other to create a first common edge for the first sheet and a second common edge for the second sheet, wherein the capacitor element is capable of supporting a direct current potential, and thereby storing an electrical charge and energy;
    (b) a first metal coating applied to the first common edge of the capacitor element and a second metal coating applied to the second common edge of the capacitor element, wherein the first and second coatings are applied by thermal spraying, and wherein the first and second coatings are selected from the group consisting of zinc and zinc rich alloys;
    (c) a first metal terminal welded to the first coating to form a metallurgical bond, wherein the first metal terminal is selected from the group consisting of aluminum and aluminum rich alloys; and
    (d) a second metal terminal is welded to the second coating to form a metallurgical bond, and the second metal terminal is selected from the group consisting of aluminum and aluminum rich alloys.

12. The capacitor of claim 11, wherein the coating applied to the first and second common edges is zinc.

13. The capacitor of claim 12, wherein the metal coating is applied by electric arc spraying to the first and second common edges of the capacitor element and has (i) a thickness of from 0.2 to 1.5 mm, and (ii) a porosity of 10 to 60%.

14. The capacitor of claim 13, wherein the first and second terminals are strips of aluminum having a thickness of from 0.2 to 0.7 mm.

15. The capacitor of claim 14, wherein the metallurgical bond between the metal coating applied to the first common edge and the first metal terminal and the metallurgical bond between the metal coating applied to the second common edge and the second metal terminal are solid solution bonds, and the pull strength of the bond is at least 5 pounds.

16. The capacitor of claim 14, wherein the first and second terminals are aluminum.

17. The capacitor of claim 11, wherein the first and second sheets are wound together to form a cylinder, and the first and second common edges of the capacitor element are the ends of the cylinder, and wherein the metal coating applied to the first and second common edges of the capacitor element has a thickness of from 0.2 to 1.5 mm and a porosity of 10 to 60%, and the first and second terminals have a thickness of from 0.2 to 0.7 mm.

18. The capacitor of claim 11, wherein the first and second coatings are zinc and the first and second terminals are aluminum, and wherein (i) the first zinc coating and the first aluminum terminal, and (ii) the second zinc coating and the second aluminum terminal, are stitch welded and each weld has a pull strength of least 10 pounds.

19. An array of capacitors, comprising:
  (a) a plurality of capacitor elements, wherein each capacitor element has a first set of conductive plates and a second set of conductive plates, wherein the plates in the first set of plates and the plates in the second set of plates are arranged in alternating layers, separated by a dielectric, and wherein the first set of plates and the second set of plates are staggered relative to each other to create a first common edge for the first set of plates and a second common edge for the second set of plates;
  (b) a first metal coating applied to the first common edge of each of the capacitor elements and a second metal coating applied to the second common edge of each of the capacitor elements, wherein the first and second coatings are applied by thermal spraying, and wherein the first and second coatings are selected from the group consisting of zinc and zinc rich alloys; and
  (c) a first metal terminal sheet welded to the first coating of each of the capacitor elements to form a metallurgical bond, wherein the first metal terminal is selected from the group consisting of aluminum and aluminum rich alloys; and
  (d) a second metal terminal sheet welded to the second coating of each of the capacitor elements to form a metallurgical bond, and the second metal terminal is selected from the group consisting of aluminum and aluminum rich alloys.

20. The array of capacitors of claim 19, wherein the capacitor elements comprise first and second thermoplastic polymer sheets having a metalized surface formed by vapor deposition, wherein the first and second sheets are arranged in multiple layers and staggered relative to each other to create a first common edge for the first sheet and a second common edge for the second sheet, wherein the capacitor element is capable of supporting a direct current potential, and thereby storing an electrical charge and energy.

21. The array of capacitors of claim 20, wherein the first and second polymer sheets forming the capacitor elements are wound together to form a cylinder, and the first and second common edges of the capacitor element are the ends of the cylinder, and wherein the metal coating applied to the first and second common edges of the capacitor element has a thickness of from 0.2 to 1.5 mm and a porosity of 10 to 60%, and the first and second terminal sheets have a thickness of from 0.2 to 0.7 mm.

22. The array of capacitors of claim 19, wherein the first and second coatings for each capacitor element are zinc, and the first and second terminal sheets are aluminum, and wherein for each capacitor element in the array, (i) the first zinc coating and the first aluminum terminal sheet, and (ii) the second zinc coating and the second aluminum terminal sheet, are stitch welded and have a pull strength of least 5 pounds.

* * * * *